(12) United States Patent
Li et al.

(10) Patent No.: US 7,432,006 B2
(45) Date of Patent: Oct. 7, 2008

(54) ELECTROCHEMICAL PROBE FOR SCREENING MULTIPLE-CELL ARRAYS

(75) Inventors: Yi-Qun Li, Walnut Creek, CA (US); Yi Dong, Tracy, CA (US); Ning Wang, Martinez, CA (US)

(73) Assignee: Intematix Corporation, Fremont, CA (US)

( * ) Notice: Subject to any disclaimer, the term of this patent is extended or adjusted under 35 U.S.C. 154(b) by 551 days.

(21) Appl. No.: 10/857,604

(22) Filed: May 27, 2004

(65) Prior Publication Data

US 2005/0064251 A1    Mar. 24, 2005

Related U.S. Application Data

(60) Provisional application No. 60/473,596, filed on May 27, 2003.

(51) Int. Cl.
*H01M 2/00* (2006.01)
*H01M 2/02* (2006.01)
*H01M 8/10* (2006.01)
*H01M 4/00* (2006.01)
*G01N 27/26* (2006.01)

(52) U.S. Cl. ............................ 429/34; 429/32; 429/30; 429/40; 429/44; 204/410; 204/411; 204/421

(58) Field of Classification Search .................... 429/30, 429/31, 32, 33, 34; 204/410, 411, 421
See application file for complete search history.

(56) References Cited

U.S. PATENT DOCUMENTS

| | | |
|---|---|---|
| 6,187,164 B1 * | 2/2001 | Warren et al. .................. 205/81 |
| 2002/0009627 A1 * | 1/2002 | Smotkin ....................... 429/30 |
| 2003/0041671 A1 * | 3/2003 | Hajduk et al. ................. 73/800 |

* cited by examiner

*Primary Examiner*—Gregg Cantelmo
*Assistant Examiner*—Eugenia Wang
(74) *Attorney, Agent, or Firm*—Fliesler Meyer LLP (57) ABSTRACT

Novel systems for combinatorially screening an array of electrochemical cells are disclosed. The screening apparatus may comprise a system of electrodes and electrolytes common to each of the members of an electrochemical cell array. An electrochemical probe is used to supply a reactive fluid (or reactive species) to only one of the cells in the array at a time. The probe is configured to address each of the cells of the array individually, and to be chemically isolated from all of the other cells of the array. Thus, the cells of the array that are not being addressed by the probe are in a non-active condition. Such a system is capable of combinatorially screening a library of materials, including catalyst, electrode, and electrolyte materials, wherein each of the members of the library defines one of the cells of the array.

2 Claims, 8 Drawing Sheets

ELECTROCHEMICAL PROBE FOR SCREENING MULTIPLE-CELL ARRAYS

REFERENCE TO RELATED APPLICATIONS

The present application claims the benefit of U.S. Provisional Patent Application No. 60/473,596, by Yi-Qun Li et al., titled "Electrochemical Probe Method for Multiple Cells Testing," and filed May 27, 2003. U.S. Provisional Patent Application No. 60/473,596 is hereby incorporated herein by reference in its entirety.

BACKGROUND OF THE INVENTION

1. Field of the Invention

Embodiments of the present invention are directed in general to novel systems and methods for testing multiple electrochemical cells in a high-throughput, combinatorially manner. In particular, the methods disclosed herein may be used to combinatorially screen the materials used in the electrodes, electrolyte, and catalysts of the electrochemical cells, operating parameters of the cells may be evaluated as well.

2. State of the Art

The successful conversion of chemical energy into electrical energy in a primitive fuel cell was first demonstrated over 160 years ago. However, in spite of attractive system efficiencies and environmental benefits associated with fuel-cell technology, it has proven difficult to translate the early scientific experimental work into commercially viable products. These problems have often been associated with the lack of suitable materials that would enable the cost and efficiency of the electrical power generated from a fuel cell to compete with existing technologies.

Significant advances have been made in polymer electrolyte fuel cell technology during the past few years, with substantial improvements having been demonstrated in the areas of efficiency and practical design. In fact, prototypes of portable and automobile batteries based on fuel cells have already been demonstrated. There remain, however, challenges associated with electrocatalyst cost; furthermore, catalyst activity and stability are still major concerns that will impact polymer electrolyte fuel cells in the future.

To date, the catalysts are by and large developed by individual trial-and-error methods, and no significant advances have been made during the past decade with regard to platinum alloy catalyst materials. What is needed in the art is a systematic approach, using combinatorial synthesis and high-throughput screening, to develop non-precious and/or low-precious metals (and alloys thereof) to replace platinum. The advantages of such advances include fuel cells with lower cost, making them more practical to use. Catalyst libraries containing a large number of different catalysts can be synthesized in parallel, but there is still a need for high-throughput screening methods to efficiently test and evaluate such catalyst libraries.

SUMMARY OF THE INVENTION

An electrochemical probing apparatus and method are disclosed for combinatorially screening the parameters of electrochemical cell operation; particularly catalyst activity. In general, the system comprises 1) a multiple cell assembly in which all of the cells are electrically connected in parallel; 2) a reservoir or chamber for delivering one of a pair of two electrochemically reactive fluids (or species) to one side of the electrochemical cell array, and 3) a chemical gas or liquid probe, configured to deliver another electrochemically reactive fluid (the second of the pair) to the other side of the array. In one embodiment of the invention the electrochemical cell is a fuel cell; and the first and second electrochemically reactive fluids are fuel and oxidant, respectively.

The probe is configured to individually address each cell of the array, such that the cells of the array that not being interrogated by the probe remain electrochemically non-active. Thus, there is no electrical contribution to the array originating from any of the non-active cells, with the advantage that no electrical isolation between cells of the array is necessary because the electrical output from the array is equal to the individual cell being addressed by the probe. Such a system is capable of combinatorially screening a catalyst library, wherein each of the members of the library defines one of the cells of the array with different catalyst, electrode, or electrolyte materials.

In one embodiment of the present invention, the system for combinatorially screening an array of electrochemical cells comprises:

an electrolyte common to each of the cells of the array;

an anode common to each of the cells of the array, and an anode catalyst library positioned between the anode and the electrolyte such that the anode catalyst library defines the individual cells of the electrochemical cell array;

a cathode common to each of the cells of the array, and a common cathode catalyst layer positioned between the cathode and the electrolyte;

a common reservoir for supplying a second electrochemically reactive species to at least a portion of the common cathode catalyst layer; and an electrochemical probe configured to address each of the cells of the array individually, and to supply a first electrochemically reactive fluid (which may be a gas or a liquid) to the individual members of the anode catalyst library;

wherein none of the cells of the array contribute an electrical output with the exception of the cell that is receiving a fluid from the probe.

Of course, variations on this theme are possible, where membrane/catalyst assembly is flipped over such that the anode cathode library is on the reservoir (wherein the term "reservoir" includes a chamber) side of the system, and the reservoir would then supply the first electrochemically reactive fluid to the bottom side of the assembly. In another embodiment the plumbing supply lines delivering the first and second electrochemically reactive fluids to the system can be switched, so that the second electrochemically reactive species is delivered by the probe and the first electrochemically reactive species is delivered to the cells from the reservoir. Again, the catalyst library can be on the top or the bottom of the assembly: when it is on top it is the cathode catalyst library because it receives the second electrochemically fluid from the probe; when it is on the bottom it is the anode catalyst library because it receives first electrochemically reactive fluid from the reservoir.

Typical steps in a method by which the present system may be used include:

providing an electrolyte common to each of the cells of the array;

providing an anode common to each of the cells of the array, and an anode catalyst library positioned between the anode and the electrolyte such that the anode catalyst library defines the individual electrochemical cells of the array;

providing a cathode common to each of the cells of the array, and a common cathode catalyst layer positioned between the cathode and the electrolyte;

supplying a second electrochemically reactive fluid to at least a portion of the common cathode catalyst layer;

providing a probe configured to address each of the cells of the array individually, and supplying a first electrochemically reactive fluid (which may be a gas or liquid) to one of the electrochemical cells defined by the anode catalyst library; and measuring an open circuit voltage and a load current from an electrical connection between the anode and the cathode outside the electrochemical cell under test.

As with the apparatus, the orientation of the catalyst library may be reversed with respect to the cathode and the anode, and the first electrochemically reactive species may be provided by the reservoir if the second electrochemically reactive species is supplied by the probe.

DETAILED DESCRIPTION OF THE INVENTION

Prior art methods for combinatorially screening fuel cells have included devices that utilize an array of sensor electrodes, in fact, one sensor electrode dedicated to each of the fuel cells under test. While such devices may have the ability to obtain performance data simultaneously (because sensor electrodes are being provided individually to each of the cells in the array) it entails an increase in the complexity of the accompanying hardware and wiring design necessary to enable simultaneous measurements. Such prior art methods require electrical isolation between cells. Additionally, they utilize a thin metal film patterned on the substrate (usually a silicon wafer) to connect the individual cell to the outside measurement circuit, and as such are limited because they cannot be used directly on the fuel cell, battery, or gas sensor electrode substrates that are typically porous, conducting materials.

Figure 1:
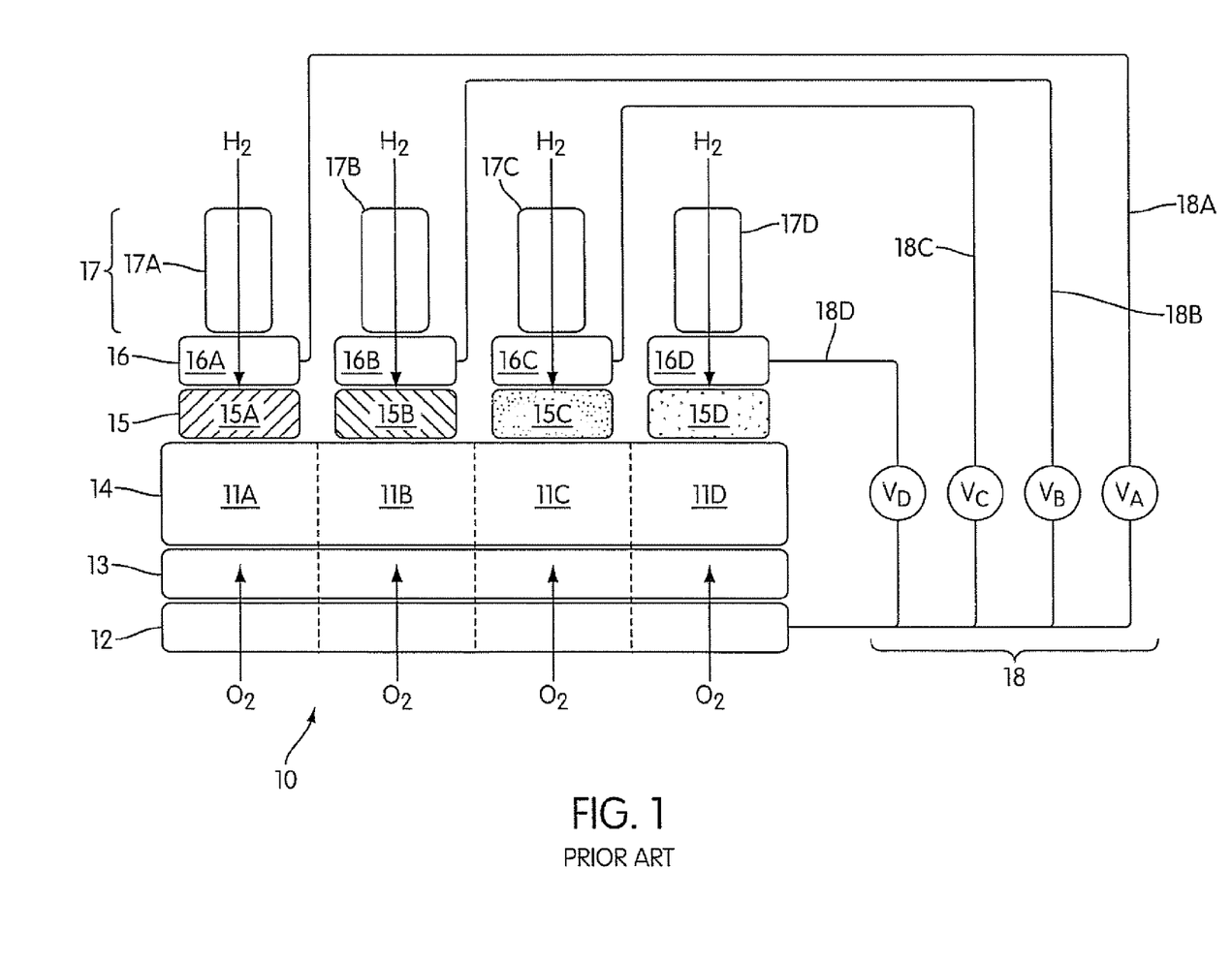
FIG. 1 shows an example of a prior art screening system having multiple sensor electrodes, one sensor electrode assigned to each of the fuel cells of an array, and the additional complexity that results.

The concept of individual sensor electrodes is generally illustrated in FIG. 1, where an array of four fuel cells is shown at 10. In this example there are four fuel cells in the array (labeled 11A, 11B, 11C, and 11D), and each of these four cells share a common cathode electrode 12, cathode catalyst 13, and polymer electrolyte 14. Assuming that anode catalysts are being evaluated in this example, each of the four cells will of course have different anode catalysts (shown generally at 15), but, by necessity, each cell will also have a different anode electrode labeled, 16A-D in the figure. The individual sensor electrodes 17A-D provide fuel (e.g., hydrogen) to the four fuel cells 11A-D, respectively, and each electrode is individually wired to the electronic packages (say, voltmeters $V_A$, $V_B$, $V_C$, and $V_D$, respectively), and to the common electrode 12 to complete the four different electrical circuits.

A disadvantage of the prior art apparatus of FIG. 1 is that it may be limited to scale up, and not suitable for testing an array containing a large number of cells. The apparatus is used predominantly to test multiple cells simultaneously, and it is not truely capable of carrying out "high throughput" screening. A further disadvantage of the apparatus of FIG. 1 is that electrical isolation is required between the cells of the array. In contrast, the present methods do not require electrical isolation between cells of the array, relying instead on chemical isolation. This is a fundamental difference between the two approaches.

Figure 2:
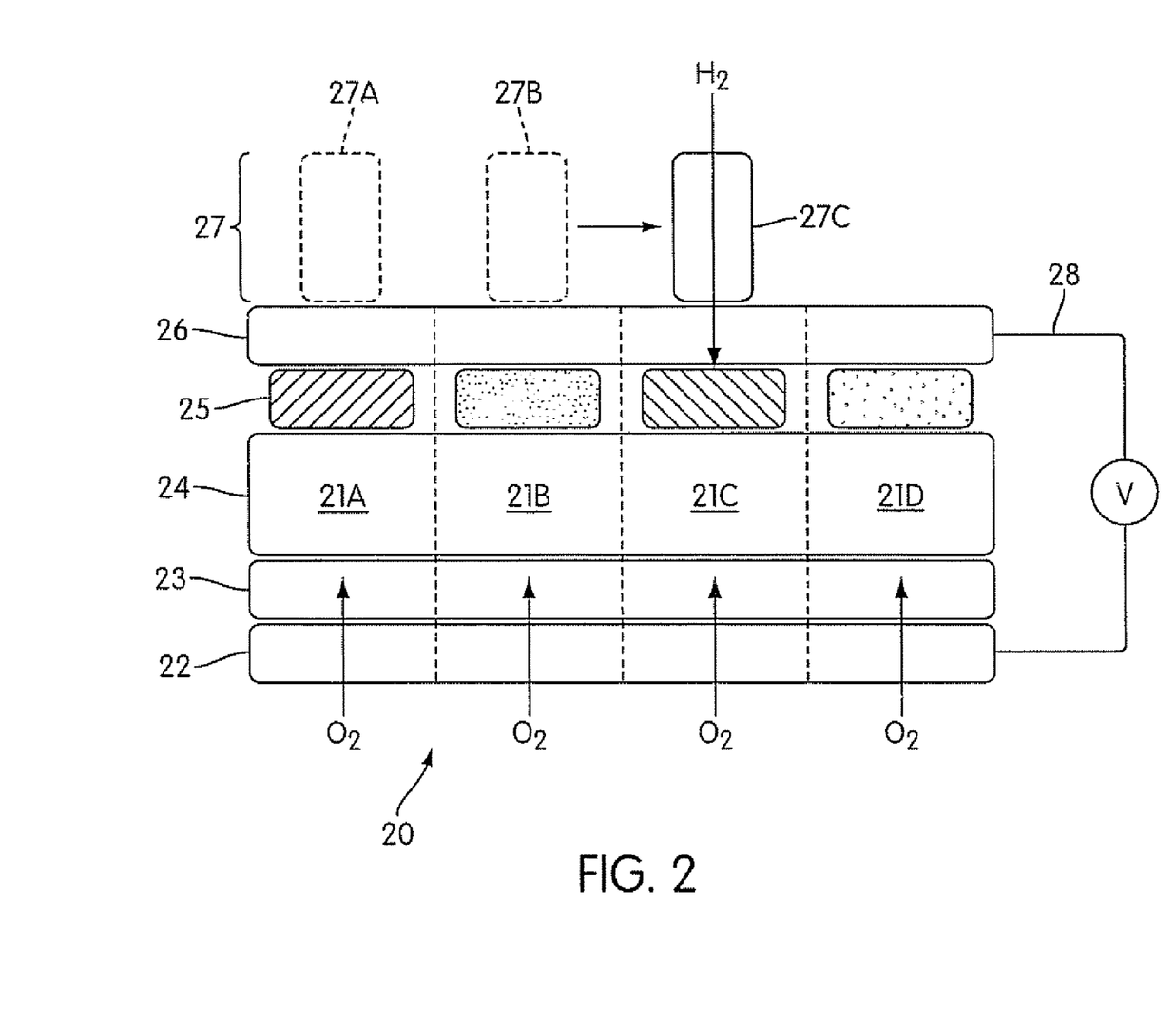
FIG. 2 illustrates the present combinatorial screening system comprising an array of electrochemical cells with a common cathode, electrolyte, and anode, and a probe configured to individually address members of the array; wherein the probe delivers either a first or second electrochemically reactive species to the cell under test such that all the other cells are in a non-active condition.

A general overview of the present embodiments is illustrated schematically in FIG. 2. The generalized system illustrated in FIG. 2 shows how a system for combinatorial screening of an array of electrochemical cells may be carried out with an individually addressable probe configured to supply one half of the reactants (a first electrochemically reactive species, for example, where the terms "fluid" and "species" may be used interchangeably in this disclosure) to an electrochemical cell. Referring to FIG. 2, the system is shown generally at 20. An array of electrochemical cells 21A-D a common cathode 22, cathode catalyst 23, and polymer electrolyte 24 similar to the prior art situation depicted in FIG. 1. The catalyst library is used on the anode side (in this example, as with the previous example), and shown generally at 25.

The present embodiments illustrated in FIG. 2 include, however, a common anode 26, and an individually addressable probe 27 that may be moved from position 27A where it would be used to screen the properties of cell 21A, position 27B to screen cell 21B, etc. Referring to FIG. 2, probe 27 is currently at position 27C, where it is supplying a first electrochemically reactive species to cell 21C. Because probe 27 is supplying the first electrochemically reactive fluid to cell 21C, and only cell 21C, cells 21A, B, and D are electrically isolated and do not participate in the measurements being made when cell 21C is being interrogated. During operation, electrons generated from the first electrochemically reactive species at common anode 26 flow clockwise through the circuit in FIG. 1, and are returned to the common cathode through circuit 28. The advantages of the present embodiments include a less complicated hardware and wiring design, as may seen by comparing electrical pathway 28 in FIG. 2 with the pathways 18 in FIG. 1.

In the example of FIG. 2, the catalyst library was positioned on the anode side of the electrochemical cells 21A-D, as would be the case when evaluating anode catalysts. It will be understood by those skilled in the art, however, that other configurations may be possible; i.e., the system could be reversed such that the common anode 26 is placed at the bottom and the common cathode 22 placed at the top of the figure, with the probe 27 delivering a second electrochemically reactive species to the electrochemical cell being screened. Alternatively, the catalyst library may be placed on the cathode side of the electrochemical cell array when the evaluation of reducing catalysts is desired. reversed such that could may be reversed such that the common cathode is at the top, and the common anode at the bottom of the apparatus.

Orientation of the Catalyst Library

Figure 3A:
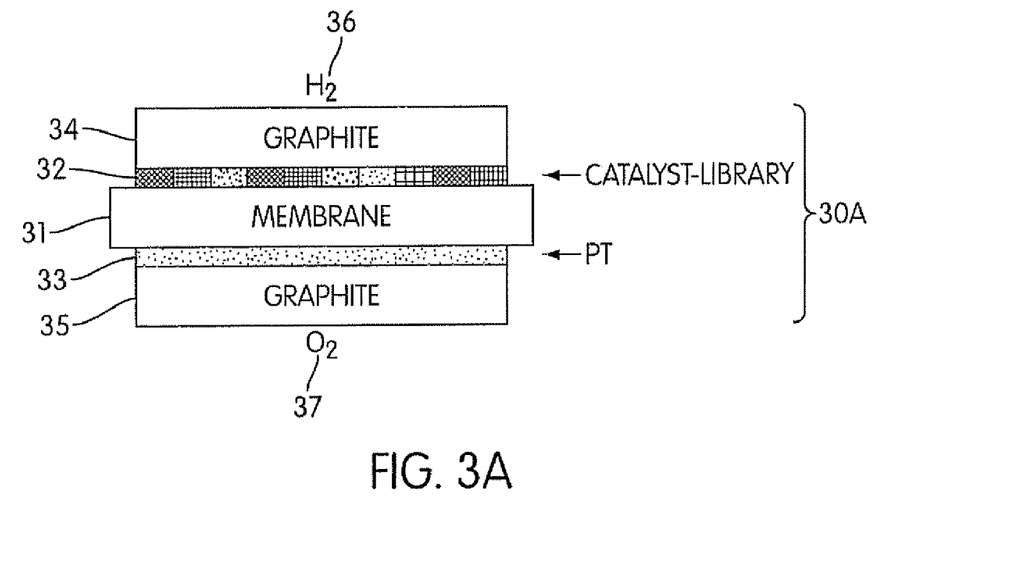
FIGS. 3A-B are crossectional views of exemplary membrane/catalyst/electrode assemblies comprising a proton exchange membrane common to each of the cells of the array, a common cathode and anode, a catalyst library on one side of the membrane and a common catalyst layer on the other; wherein the catalyst library defines the individual cells of the array; also illustrated is the manner in which a switch of the positions of the catalyst library and the common catalyst layer from one side of the membrane to the other obviates the need for switching first and second electrochemically fluid flows.
Figure 3B:
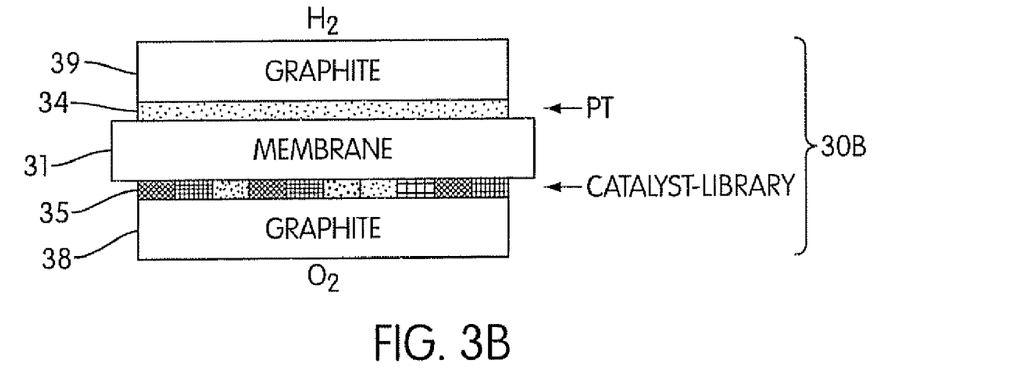
Figure 4:
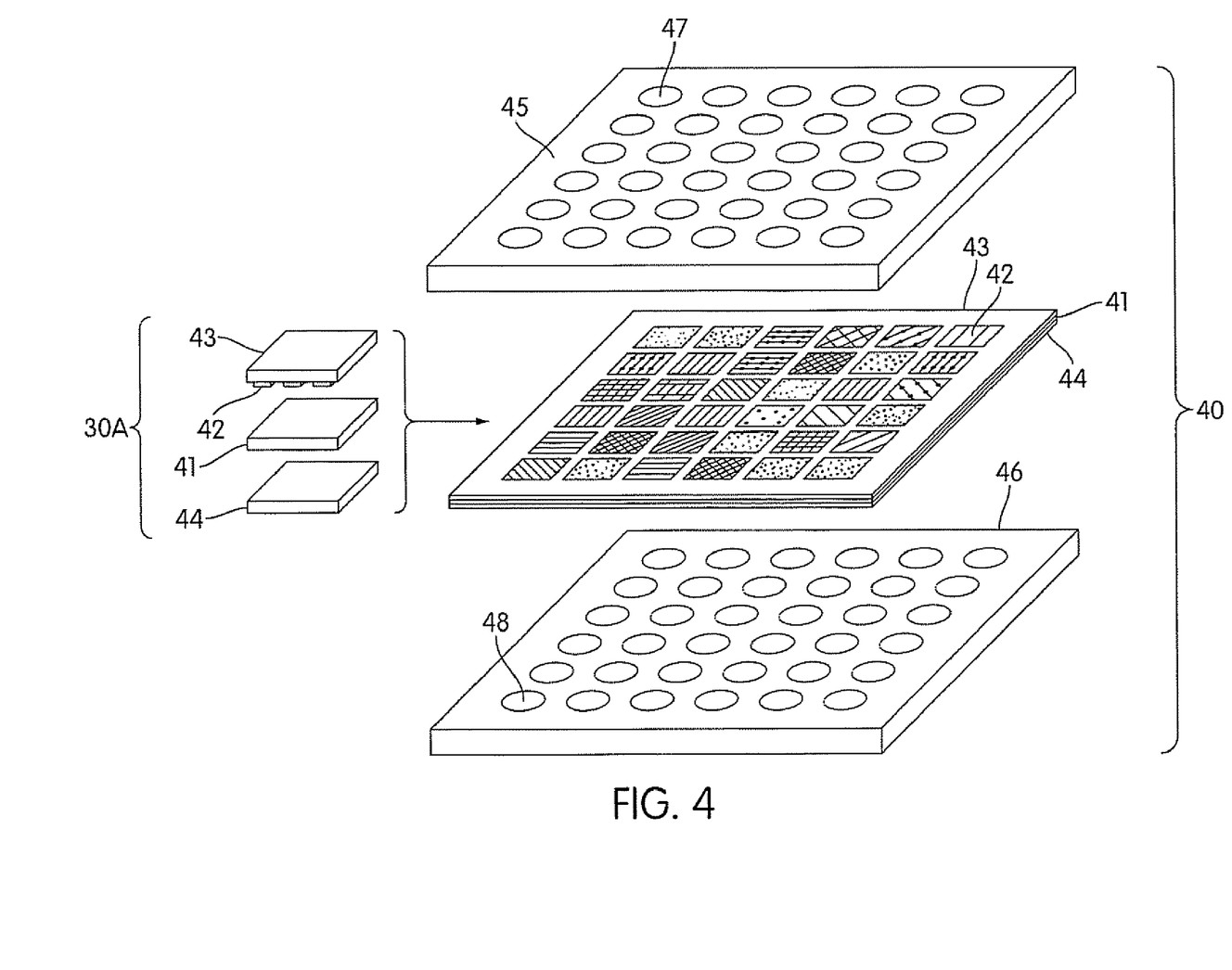
FIG. 4 is a perspective view of a membrane/catalyst/electrode assembly, shown with two support plates (which may be electrically conducting, where an electrically conducting plate is preferred in some embodiments to secure a low resistance connection to the measurement instrument circuits) positioned on each side of the assembly; the illustration emphasizes the design of the catalyst library.
Figure 5:
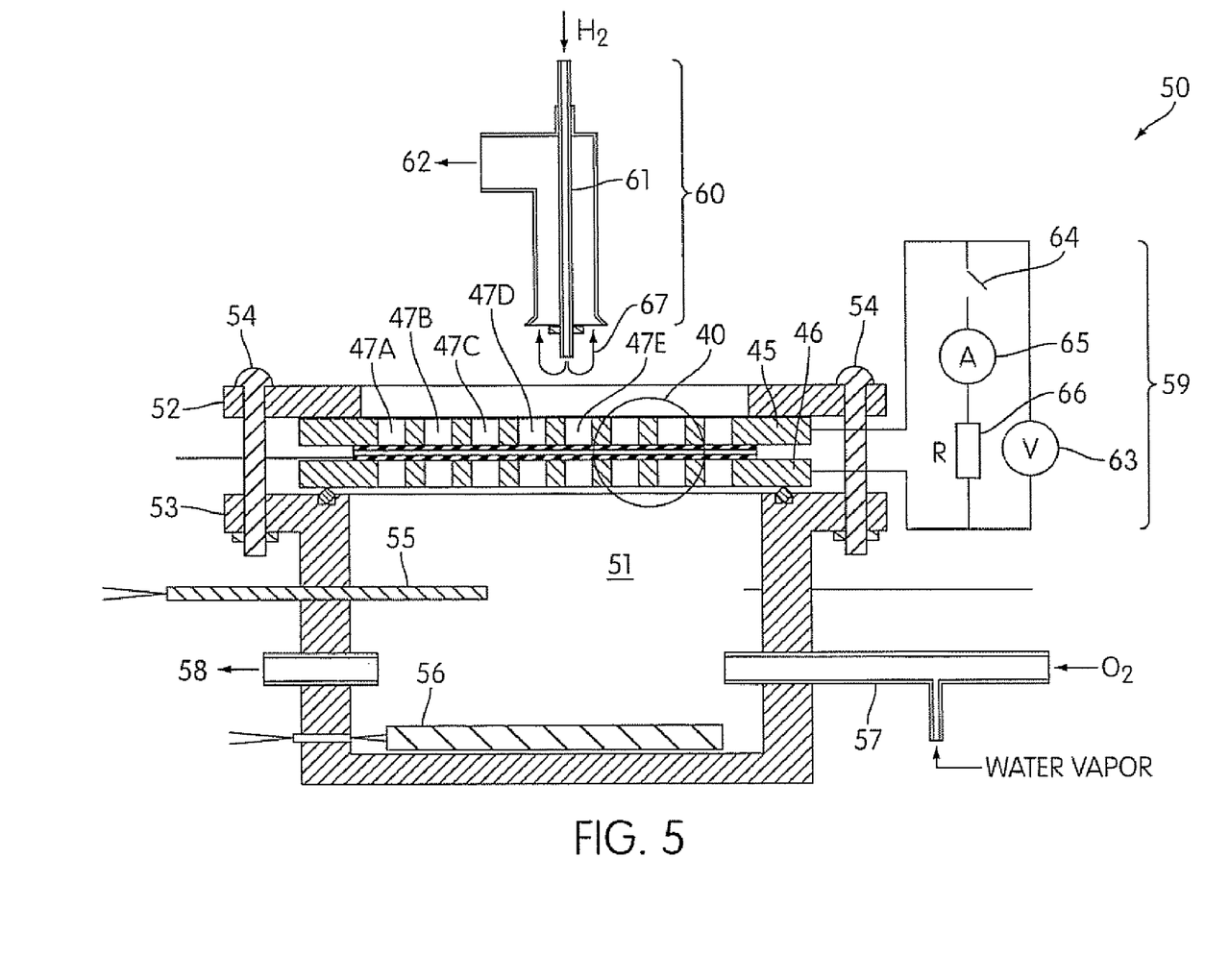
FIG. 5 is an exemplary combinatorial screening system according to the present embodiments.

Either cathode or anode catalysts may be combinatorially screened according the present methods. Exemplary embodiments that illustrate this concept are shown in FIGS. 3-5. The particular set of embodiments disclosed in FIGS. 3-5 will be presented in the context of a particular type of electrochemical cell (a fuel cell called the proton exchange membrane, or PEM fuel cell), and as such, the term "membrane" will be used interchangeably with "electrolyte layer." It will be understood by those skilled in the art, however, that there exist many different types of fuel cells based on the type of electrolyte they employ, including hydrogen ions in proton exchange membrane (PEM) fuel cells and phosphoric acid (PAFC) fuel cells, hydroxyl ions in an alkali fuel cell, sodium or magnesium carbonate ions in a molten carbonate (MCFC) fuel cell, and oxygen ions in a solid oxide (SOFC) fuel cell.

A cross-sectional view of a portion of an exemplary catalyst/membrane/electrode assembly 30A, 30B (in the present disclosure, the name for this assembly may be abbreviated to just or catalyst/membrane assembly) is illustrated schematically in FIGS. 3A-B, respectively. Referring to FIG. 3A, a proton exchange membrane 31 is sandwiched between a catalyst library 32, and a common catalyst layer 33. In other words, the catalyst library to be combinatorially screened is positioned adjacent to a first side of the membrane 31, and a common catalyst layer 33 is positioned adjacent to the opposite side of the membrane. Also shown in FIG. 3A are graphite electrodes that may be used to facilitate the positioning of the catalysts adjacent to the membrane; for example, a graphite layer 34 may serve to maintain the catalyst library 32 in a position adjacent to one side of the membrane 31. Likewise, a graphite layer 35 may serve to maintain the common catalyst layer 33 next to the opposite side of the membrane. The electrodes 34, 35 also provide electrical connections for the exterior circuit (not shown).

In the exemplary assembly illustrated in FIG. 3A a fuel 36, such as hydrogen or methanol, is supplied to the side of the membrane 31 adjacent to the catalyst library 32. Since oxidation of the fuel 36 takes place on this side of the electrolyte, the electrode on this side is the anode of the fuel cell. An oxidant 37 (such as oxygen) is supplied to the side of the membrane on which the common catalyst layer 33 is positioned. Since the oxidant 37 is reduced on this side of the electrolyte, the electrode on this side is the cathode. Each fuel cell of the array would be defined by a member of the catalyst library in FIG. 3A, and the catalyst library may be combinatorially screened to evaluate materials appropriate for catalyzing the oxidation reaction that takes place at the anode.

Alternatively, a catalyst library may be combinatorially screened for assessing a particular catalyst's ability to catalyze the reduction reaction that takes place at the cathode. A configuration appropriate for this type of screening is depicted in FIG. 3B. Here, a catalyst library 35 (given a different reference numberal because the types of materials used to catalyze a reduction reaction may differ from those used to carry out oxidation in the configuration of FIG. 3A) is positioned adjacent to cathode 38, and a common catalyst layer 34 placed adjacent to the anode 39.

The Catalyst/membrane Assembly

The catalyst/membrane assemblies 30A, 30B are illustrated in a perspective view in FIG. 4. Shown generally at reference numberal 40 in FIG. 4 is an electrolyte common to each of the fuel cells (proton exchange membrane 41), with a catalyst library 42 adjacent to an electrode 43 (which may comprise graphite) on the membrane's top side. The common catalyst layer and the opposite electrode (shown together as reference numeral 44) are positioned adjacent to the bottom side of the membrane 41.

The membrane/catalyst assembly may be sandwiched between supporting plates, such as support plates 45, 46. The support plates may be fabricated from a conducting material, and may be considered to be part of the electrode. In one embodiment, support plates 45, 46 are aluminum.

Also illustrated in FIG. 4 are aperatures 47 and 48 in the support plates 45, 46, respectively, for allowing fuel and oxygen access to the catalyst and electrolyte layers. It will be understood by one skilled in the art that if electrode 45 were to be the anode, for example, then that configuration would be consistent with the orientation of the catalyst/membrane/electrode assembly 30A shown in FIG. 3A.

An Exemplary Screening System

An exemplary system suitable for carrying out the combinatorial screening of electrochemical cell catalysts is shown generally at reference numeral 50 in FIG. 5. Referring to FIG. 5, the catalyst/membrane assembly (30A or B), associated with its two electrodes form a structure 40, which is shown mounted over the opening of a reservoir 51. The reservoir 51 contains reactants that may be delivered in common to each of the cells in the electrochemical cell array. The mounting of structure 40 to reservoir 51 may be accomplished with a top plate 52, which bolts to flanges 53 of the reservoir via fasteners 54.

The system 50 may further include peripheral measuring and processing equipment such as a thermocouple 55 within reservoir 51, for measuring the temperature of whatever the electrochemically reactive species is in the reservoir; a heater 56, for regulating the temperature of the contents of reservoir 51, as well as the temperature of the catalysts; and inlet 57, for supplying the reactants to the reservoir 51; an exhaust port 58, for exhausting products of the redox reactions being carried out by the cells of the array; and an electronic package 59 that monitors the electrical activity of the electrochemical cell under test. The electronic package 59 may comprise an electrical switch 64, a current measuring device 65, an electrical load 66, and a voltage measuring device 63, configured as shown in FIG. 5. The electronic package 59 may be installed virtually anywhere along the electrical connection between the anode and the cathode (i.e., reference numeral 28 in FIG. 2), as long as it is positioned outside the electrochemical cell under test. In an alternative embodiment, the screening system 50 may further comprise a water vapor supply to reservoir 51 to satisfy any moisture requirements of the electrolyte.

The exemplary system 50 further comprises a probe 60 that is configured to supply either of the electrochemical reactants (meaning either the first or second, where the first and second may, for example, make up an oxidation/reduction pair) to the cells of the array. The probe 60 may individually address any member of the array, such as, for example, the cells shown schematically in FIG. 5, and defined by the openings in the electrode at 47A-D in FIG. 5. In fact, FIG. 5 is depicted at a stage of the screening process such that the probe 60 has just completed an analysis of the electrochemical cell at position 47D, and is about to repeat the process on electrochemical cell 47E of the array. The probe 60 comprises a means 61 for supplying either of the electrochemically reactive species (either the first or the second) to the cell under test, and a vacuum system 62 orientated in a vertical direction relative to the array, for removing excess reactant, and to avoid diffusion of the fluid being delivered by the probe from the electrochemical cell being screened.

To configure the probe to be capable of individually addressing each of the cells in the array, the probe 60 may be mounted on a X-Y motion stage (not shown in FIG. 5) capable of accurately and quickly locating an individual cell. The X-Y motion stage moves the probe from cell to cell to map the electrocatalytic activity of an entire library. Automation of the X-Y motion stage may be achieved by providing a computer controlled motor to drive the stage, and a computer monitored data acquisition system for collecting and analyzing the results of the test.

In the exemplary probe 60 of FIG. 5, the reactant supply 61 and exhaust 67 comprise two concentric and co-axially positioned tubes. The purpose of the exhaust function 67 of probe 60 is to ensure that each of the adjacent electrochemical cells in the array (for example, cell 47D) remains chemically isolated and in an electrochemically non-active condition as the screening process is performed on cell 47E. The exhaust function of the outer annulus may be provided by a vacuum system 62, which substantially prevents the lateral flow of hydrogen over the array, and thus reduces interference from the cell under test with its adjacent neighbors.

Thus, the present embodiments provide for a screening system that comprises electrodes that are common to each of the electrochemical cells in the array. In fact, each of the cells of the array may share a common electrolyte and one half of the pair of reactants (e.g., either the first or second electrochemically reactive species) necessary for an oxidation/reduction reaction to take place within the electrochemical cell, in addition to the common electrodes. It is the fluid flow 62 from the probe 60 (the flow 60 making up the other half of the redox reactant pair) that is localized to any one particular cell in the array, wherein this cell would be the site being interrogated at that stage of the screening).

To reiterate, advantages of the present system are based on a chemical isolation method, and include the ease of which both cathode and anode catalytic activity may be assessed. Both the cathode catalytic activity and the anode catalytic activity of a catalyst library may be tested using screening system of FIG. 5, simply by flipping the orientation of the membrane/catalyst/electrode assembly 40 within the system. For example, if the catalyst library is exposed to either hydrogen or methanol, the anode catalytic activity is measured, but by flipping the membrane/catalyst assembly over such that the catalyst library is exposed to either oxygen or air from reservoir 51, the cathode catalytic activity would be measured. Since the same screening system is used for both evaluations, and it is not necessary to alter, or switch, or re-plumb any of the lines that provide air, oxygen, methanol, or hydrogen to the system.

More importantly, a large number of catalysts and/or electrolytes array may be prepared directly on a common electrode, without having to worry about electrical isolation. The present embodiments thus provide a simple and viable approach for the high throughput screening of materials used in and by electrochemical reactions, including electrode, electrolyte, and catalyst materials.

Screening Hydrogen Fuel Cell Arrays

In a particular embodiment, the apparatus of FIG. 5 may be used in the configuration of a proton exchange membrane type of fuel cell, with hydrogen as the fuel and oxygen as the oxidant. Although these hydrogen fuel cells may be tested by configuring the probe 60 to supply either hydrogen gas to the anode, or oxygen gas to the cathode, the former situation may be preferrable since air may be used as a diluent, with little or no effect on the hydrogen's ability to ionize (undergo oxidation) at the anode. In other words, the air in a mixture of air and hydrogen has little effect on the hydrogen.

This may be contrasted with the situation where oxygen is supplied to the cells via the probe 60. In this case, either nitrogen or argon is preferred as a diluent gas at the probe side of the array.

Screening Methanol Fuel Cell Arrays

It may be desirable to evaluate direct methanol fuel cells (fuel cells where methanol may be delivered directly to the anode catalytic surface, without having to resort to a reforming process that enriches the hydrogen content of the fuel to an acceptable electrochemical reactivity). For such a case, an alternative embodiment provides for the reservoir 51 to contain the methanol fuel, since it is less practical to configure the probe 60 to deliver fluids in liquid form. In this embodiment, a seal having an adequate solvent resistance may be used between the reservoir 51 and the membrane/catalyst assembly. The seal may comprise a rubber-sealing gasket. Further variations to the system would include a liquid pumping system circulating the methanol fuel within system 50.

EXAMPLES

The following examples illustrate various ways in which a fuel cell array may be combinatorially screened using the apparatus and methods described herein. In Example 1, the open circuit voltage and the 1KΩ load current was measured for each of the cells of a 100 fuel cell array. In Example 2, the fuel cell power generated by fuel cells using catalysts comprising a binary combination of four different metals was measured.

The following examples are given for the purpose of illustrating embodiments of the present invention and should not be construed as being limitations on the scope or spirit of the instant invention.

Example 1

Measurement of Open Circuit Voltage and 1KΩ Load Current for a 100 Member Catalyst Library A multiple fuel cell assembly comprising 100 individual fuel cells was prepared by the following procedure:

1. Sputter depositing 100 different Pt-M-M' alloys (3 mm×3 mm), as catalysts, onto a 40 mm×40 mm square piece of porous carbon paper purchased from ElectroChem, Massachusetts, and 2. Thermally pressing together the three layers of the multiple fuel cell assembly: a) the Pt-carbon electrode (the common catalyst layer referred to in the description above), b) an intermediate proton exchange membrane (in this example Nafion™, and c) the 100-member catalyst library adhered to a carbon electrode.

Figure 6A:
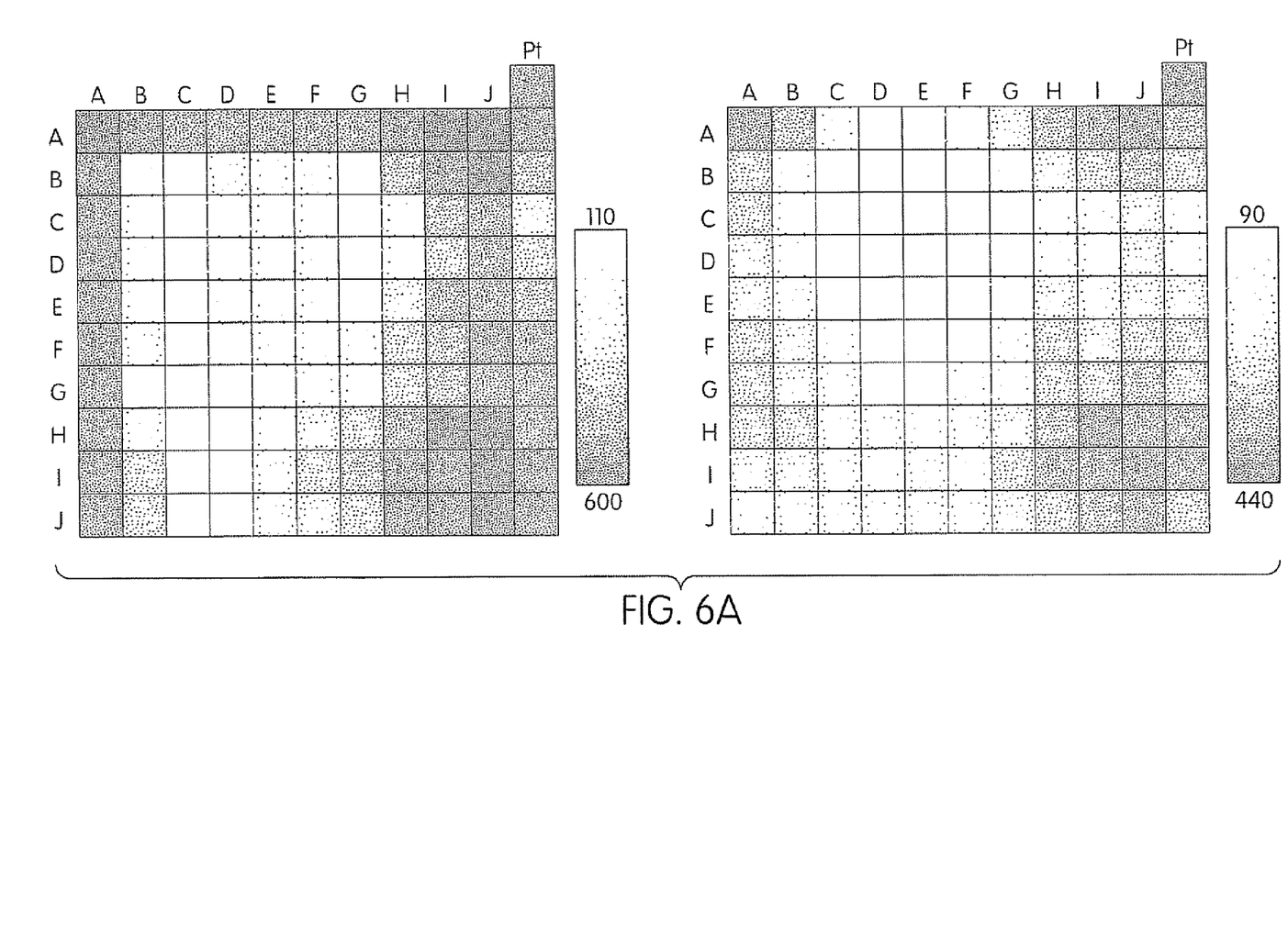
FIG. 6A show plots of the open circuit voltage and the load current (left and right, respectively) obtained from testing a catalyst library in the exemplary apparatus of FIG. 5; each "pixel" or square in the plot represents the result obtained from an individual member of the catalyst library and thus one of the electrochemical cells of the array, the plot generated when the catalyst library is positioned adjacent to the hydrogen side of the cell such that anode catalytic activity may be evaluated.

The multiple fuel cell assembly was then clamped between two aluminum plates. Each plate contained 100 circular holes, each hole having a diameter of about 2.5 mm. The multiple fuel cell assembly was oriented in the testing apparatus such that the catalyst library was facing the anode (and the hydrogen dispensing probe). The open circuit voltage and the 1KΩ load current of the 100-membered fuel-cell assembly were measured using circuitry shown in FIG. 5. The catalytic activity of each of the 100 different Pt alloy catalysts in the library was assessed, and the results are shown in FIG. 6A. In FIG. 6A, the open circuit voltage is shown on the left, and plotted in units of mV. The 1KΩ load current is shown on the right, and plotted in units of mA.

Figure 6B:
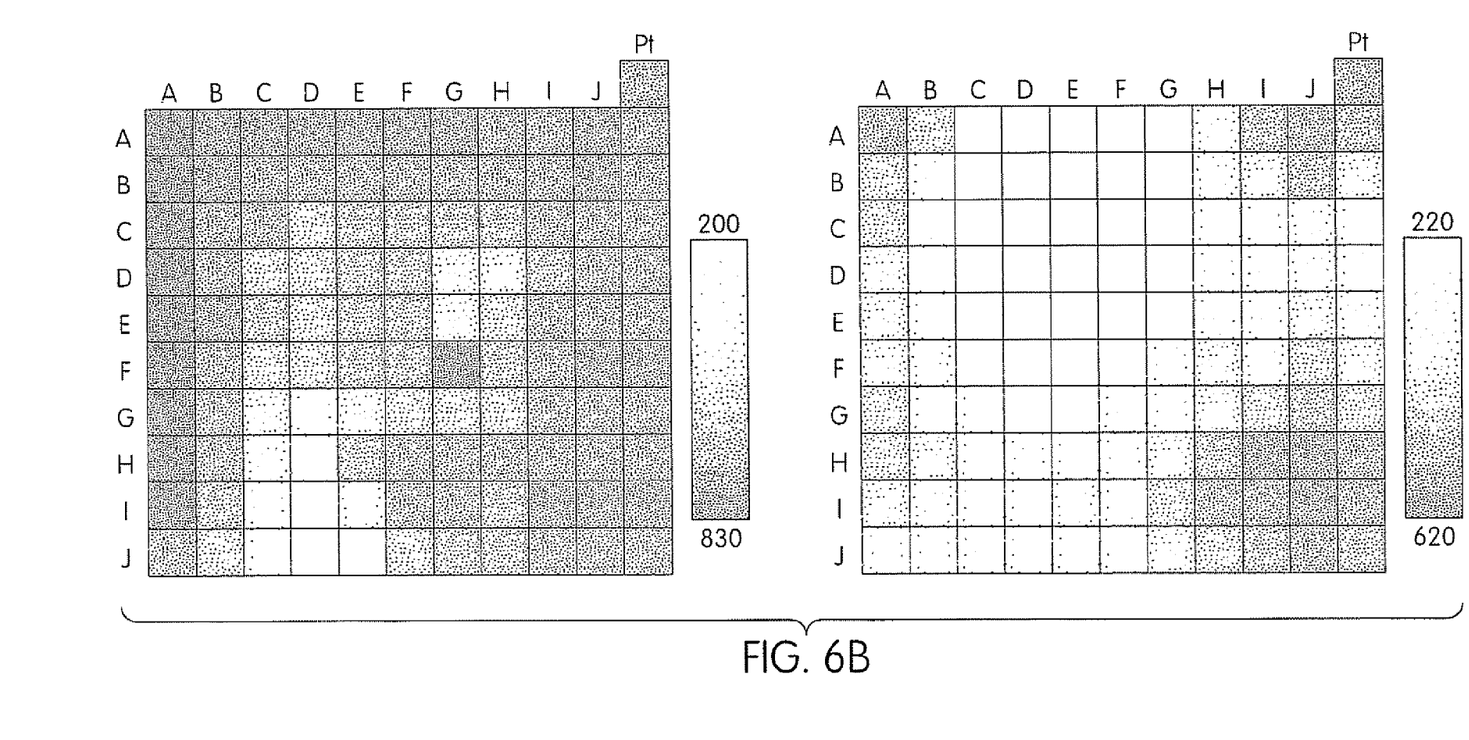
FIG. 6B show plots similar to that of FIG. 6A, except that in this case the catalyst library is positioned adjacent to the oxygen side of the fuel cell such that cathode catalytic activity may be measured.

The orientation of the multiple fuel cell assembly was then reversed such that the catalyst library faced the oxygen side of the array. Thus, the catalytic activity of each member of the library on the cathode was assessed. The results are shown in FIG. 6B, again where open circuit voltage is shown on the left in units of mV, and the 1KΩ load current on the right in mA.

The results show that (for this particular experiment) many of the Pt-alloys in the library are good anode catalysts, but only a few of the Pt-alloys are promising candidates as cathode catalysts.

Example 2

Measurement of Fuel Cell Power

Based on the results of Example 1, four different metals (A, B, I, and J) were selected for further evaluation. The four metals were then taken in pairs such that a binary combination of the four metals together comprised 40% by weight of the total weight of the catalyst, with Pt contributing the remaining 60%. In other words, binary combinations of the four metals were taken such that any one catalyst comprised 60% by weight Pt, and 40% by weight of the two components of the binary system.

The relative proportions of the two metals in the binary (non-Pt) portion of the catalyst were arranged such that, for a particular combination represented by "L-R," the concentration of metal L was increased from 0 to 60 in increments of 10 mole percent (i.e., 0 10, 20, 30, 40, 50, and 60), while the concentration of the corresponding metal R was concurrently decreased in increments of 10 mole percent (i.e., 60, 50, 40, 30, 20, 10, and 0, respectively). In other words, each of the catalysts always comprised 60 percent by weight Pt, and 40 percent by weight of the binary L-R, where L was varied from 0 to 60 mole percent in 10 percent increments, and R was 60 minus L. The six combinations of the four metals, taken two at a time to form the binary, were A-B, A-I, A-J, B-I, B-J, and I-J.

The catalysts were prepared by ion beam sputter deposition of the metals onto carbon electrode paper. A multiple fuel cell assembly was then fabricated using the techniques discussed in Example 1.

Figure 7:
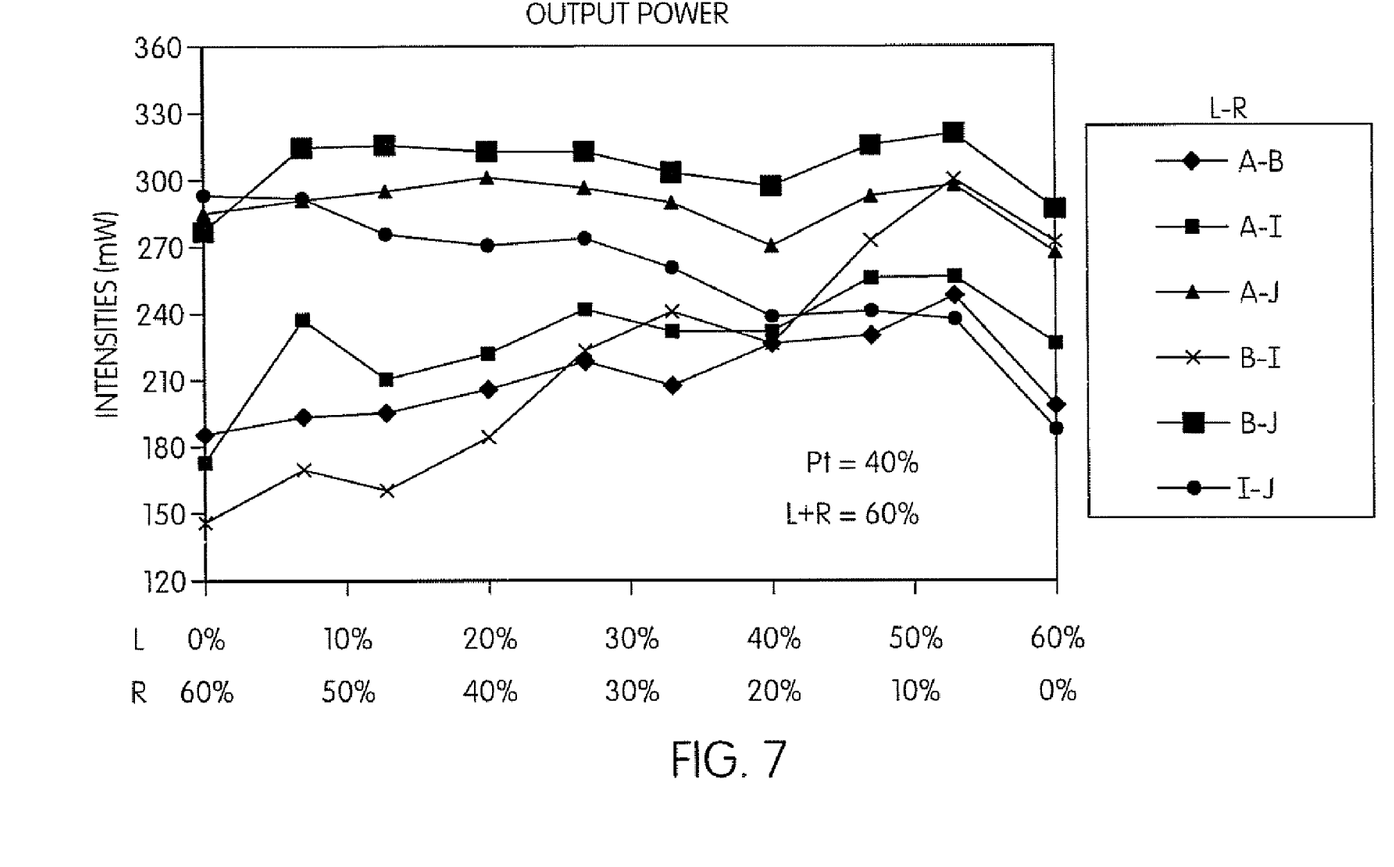
FIG. 7 is a graph of the electrical power generated from the individual members of a fuel cell array, each cell having a different catalyst alloy, and the experiment demonstrating the high-throughput and efficiency of the combinatorial testing methods provided by the present embodiments.

Ten measurements of open circuit voltage and 1KΩ load current were made as a function of metal composition by probing along each binary system (4 mm×40 mm). The fuel cell powers (open circuit voltage in mV, multiplied by the 1KΩ load current in mA) of the six different binary systems are plotted as function of composition in FIG. 7.

Many modifications of the exemplary embodiments of the invention disclosed above will readily occur to those skilled in the art. Accordingly, the invention is to be construed as including all structure and methods that fall within the scope of the appended claims.

What is claimed is:

1. A system for combinatorially screening an array of electrochemical cells, the system comprising:
   an electrolyte common to each of the cells of the array;
   an anode common to each of the cells of the array, and an anode catalyst library positioned between the anode and the electrolyte such that the anode catalyst library defines the individual electrochemical cells of the electrochemical cell array;
   a cathode common to each of the cells of the array, and a common cathode catalyst layer positioned between the cathode and the electrolyte;
   a common reservoir for supplying a second electrochemically reactive species to at least a portion of the common cathode catalyst layer; and
   an electrochemical probe configured to address each of the cells of the array individually, and to supply a first electrochemically reactive species to the individual members of the anode catalyst library;
   wherein each of the cells of the array are in a non-active condition with the exception of the cell that is receiving the electrochemically reactive species from the probe; and
   wherein the electrochemical probe is mounted to an X-Y motion stage controlled by a computer, and the system is monitored by a data acquisition system for collecting and analyzing the results of a test.

2. A system for combinatorially screening an array of electrochemical cells, the system comprising:
   an electrolyte common to each of the cells of the array;
   an anode common to each of the cells of the array, and a common anode catalyst layer positioned between the anode and the electrolyte;
   a cathode common to each of the cells of the array, and a cathode catalyst library positioned between the cathode and the electrolyte such that the cathode catalyst library defines the individual cells of the electrochemical cell array;
   a common reservoir for supplying a first electrochemically reactive species to the individual members of the cathode catalyst library; and
   an electrochemical probe configured to address each of the cells of the array individually, and to supply a first electrochemically reactive species to at least a portion of the common anode catalyst library;
   wherein each of the cells of the array are in a non-active condition with the exception of the cell that is receiving the electrochemically reactive species from the probe; and
   wherein the electrochemical probe is mounted to an X-Y motion stage controlled by a computer, and the system is monitored by a data acquisition system for collecting and analyzing the results of a test.

* * * * *